United States Patent [19]

Hansel

[11] Patent Number: 4,650,577

[45] Date of Patent: Mar. 17, 1987

[54] APPARATUS FOR TREATING AND PURIFYING WASTE WATER

[75] Inventor: Bradley L. Hansel, Slaughter, La.

[73] Assignee: Delta Process Equipment Co., Inc., Denham Springs, La.

[21] Appl. No.: 776,561

[22] Filed: Sep. 16, 1985

[51] Int. Cl.$^4$ ................................................ C02C 1/08
[52] U.S. Cl. .............................. 210/195.3; 210/221.2; 210/525
[58] Field of Search ............ 210/620, 628, 629, 198.1, 210/194, 195.3, 209, 220, 221.1, 221.2, 525

[56] References Cited

U.S. PATENT DOCUMENTS

| | | | |
|---|---|---|---|
| 3,195,727 | 7/1965 | Kibbee | 210/195 |
| 3,355,023 | 8/1965 | Foster | 210/195 |
| 3,507,393 | 3/1968 | Weis et al. | 210/195 |
| 3,694,353 | 11/1971 | Yang | 210/7 |
| 3,919,086 | 11/1975 | Peck | 210/197 |
| 3,920,779 | 11/1975 | Abele | 261/87 |
| 3,923,656 | 12/1975 | Krebs | 210/86 |
| 3,992,299 | 11/1976 | Wray | 210/195.3 |
| 4,054,542 | 10/1977 | Kbers et al. | 210/195 S |
| 4,246,114 | 1/1981 | Krebs | 210/151 |
| 4,259,185 | 3/1981 | Mixon | 210/195.3 |

Primary Examiner—Frank Sever
Attorney, Agent, or Firm—David L. Ray

[57] ABSTRACT

An apparatus for treating and purifying waste water containing organic pollutants and includes a vertical tank for receiving waste water and discharging treated water, a vertical clarifying structure located within the tank and connected to the tank having sidewalls which diverge from a bottom opening to a larger top opening, a series of air injecting pipes connected to the tank and located inside the tank for injecting air into the lower portion of the tank to aerate the waste water in the tank, an inlet located in the upper portion of the tank for supplying waste water to the tank, and an output connected to the tank for removing treating water from the tank, the outlet being located in the upper portion of the clarifier, the outlet being a horizontal pipe having a vertical pipe connected to the end hereof, the top of the vertical pipe extending above the level of the waste water and treated water in the clarifier and the bottom of the vertical pipe extending beneath the level of any scum blanket on waste water in the clarifier.

6 Claims, 4 Drawing Figures

APPARATUS FOR TREATING AND PURIFYING WASTE WATER

BACKGROUND OF THE INVENTION

1. Field of the Invention

The present invention relates to the treatment of waste water, and, more particularly to the treatment of sewage and waste water generated by a residential dwelling. Even more particularly, the present invention is related to a residential waste treatment apparatus in which water is treated under aerobic conditions to transform it into a clear, odorless effluent which meets or exceeds state effluent quality standards.

2. Description of the Prior Art

Numerous devices have been disclosed in the prior art for treating sewage and waste water. Exemplary devices are shown in the following patents:

U.S. Pat. No. 4,259,185 discloses a sludge thickening apparatus including a sludge inlet and outlet, a vertical hopper within the tank having walls which diverge outwardly from a hopper bottom toward a top opening, and an air lift pipe extending upwardly through the interior of the hopper with a weir therearound. The hopper is in the general shape of a truncated cone having a cover plate 40 over the top end thereof.

U.S. Pat. No. 4,246,114 disclosesd an aerobic waste treatment package including a removable surge bowl which forms part of a centrally disposed, large capacity, surge chamber positioned above a waste treatment holding tank. The package includes a open mouth holding tank, a hanger plate extending across the open mouth of the holding tank and a plurality of porous bags suspended from the hanger plate through an opening therein into the holding tank.

U.S. Pat. No. 4,054,524 discloses an apparatus for purifying waste water containing organic contaminants including a cylindrical reaction chamber having a separating zone extending substantially along the entire length of the chamber bounded by first and second downwardly converging partition walls. The space in the vessel between the vessel wall and the first and second walls from separate waste water activation zones, at least one of which has an aerating device therein.

U.S. Pat. No. 3,920,779 discloses a submersible aerator for use in a sewage treatment system to draw air beneath the surface of the waste material in the system to promote aerobic decomposition of the waste material. The aerator is designed to draw high volumes of air into the sewage and to be relatively inacceptable to malfunction through clogging of the areator with solid particles.

U.S. Pat. No. 3,919,086 discloses a sewage treatment apparatus utilizing an anaerobic waste water treatment process to obtain an activated sludge system which is an aerobic process by providing a plurality of air sparges in the lower portion of the digestive chamber of an Imhoff tank to aerate the waste water contained therein, circulating the waste water, and relocating the feed to the tank into the gas vent areas.

U.S. Pat. No. 3,694,353 discloses an extended aeration waste water treatment in which the aeration process is carried out in a single tank. Waste water is treated for periods ranging from 12 to 14 hours and is circulated in a tank in a controlled manner to avoid settling and compaction. The tank utilizes aerators or other suitable devices to generate air bubbles to promote aerobic decomposition of the waste matter in the system.

U.S. Pat. No. 3,507,393 discloses a sewage waste water treatment system including a clarifier section of relative small area defined by baffle arrangements whose configuration cause even sewage flow across the width of the chamber. The baffle arrangement incorporates throttling inlet slots which precisely control hydraulic flow from the aeration section to the clarifier section. Downwardly flow against primary baffle means in the clarifier section is effected.

U.S. Pat. No 3,335,023 discloses a sewage treatment system comprising a unitary tank partitioned into a raw sewage treatment section and a waste sludge treatment section. Sewage treatment is effected in a two stage aeration process to aerate and treat the waste matter in the system.

U.S. Pat. No. 3,195,727 discloses a waste products treatment apparatus having a floating solid feed back structure useful in various waste treatment processes especially useful in processing industrial and domestic waste. The apparatus is directed to a structure for preventing accumulation of buoyant particles on top of the liquid in the treatment tank and for assuring return of the buoyant particles to the main treatment section of the processing apparatus. The apparatus includes a treatment on one side thereof and settling chamber on the other side thereof. The apparatus has various flow deflecting baffles and condiuts for discharging air into the system to effect aerobic treatment of the waste fluid.

U.S. Pat. No. 3,923,656 discloses a package aerobic waste treatment system particularly adapted for residential dwellings. The system includes a main holding tank to which is attached a hemispherical dome cover which contains a perforated hanger and an inner cylindrical surge chamber. An aeration pump is mounted at the bottom of the holding tank to force air throughout the system and provide necessary conditions for aerobic bacteria life.

SUMMARY OF THE INVENTION

The present invention provides an apparatus for treating and purifying waste water containing organic pollutants and includes a vertical tank for receiving waste water and discharging treated water, a vertical clarifying structure located within the tank and connected to the tank having sidewalls which diverge from a bottom opening to a larger top opening, a series of air injecting pipes connected to the tank and located inside the tank for injecting air into the lower portion of the tank to aerate the waste water in the tank, an inlet located in the upper portion of the tank for supplying waste water to the tank, and an outlet connected to the tank for removing treated water from the tank, the outlet being located in the upper portion of the clarifier, the outlet being a horizontal pipe having a vertical pipe connected to the end thereof, the top of the vertical pipe extending above the level of the waste water and treated water in the clarifier and the bottom of the vertival pipe extending beneath the level of any scum blanket on waste water in the clarifier.

The apparatus of the present invention has many advantages over the apparatus of the prior art. The apparatus of the present invention is inexpensive and easy to maintain. The apparatus is compact and is able to treat waste water from a residential dwelling to provide a clear, odorless effluent which meets or exceeds effluent quality standards of most of the individual states in the United States.

Furthermore, the present invention has an outlet which prevents the siphoning effect present in some waste treatment systems and reduces the chance of floating particles entering the effluent. This is accomplished by placing the point of intake of the effluent to be discharged beneath the scum blanket which accumulates over a period of time in many waste treatment systems.

These and other features and disadvantages of the invention will become more apparent from the following description.

DESCRIPTION OF THE PREFERRED EMBODIMENTS

Figure 1:
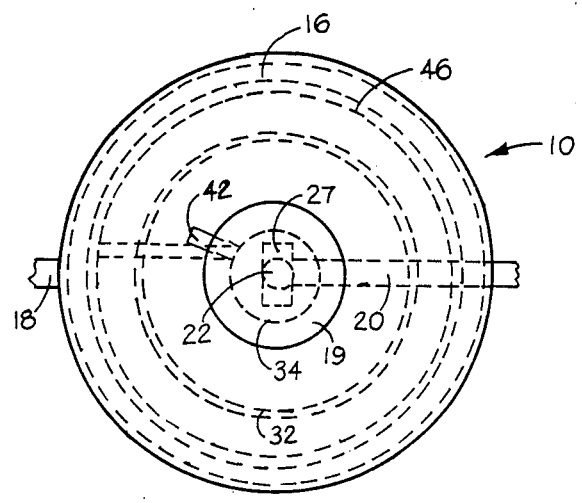
FIG. 1 is a schematic top plan view of the embodiment of the invention.
Figure 2:
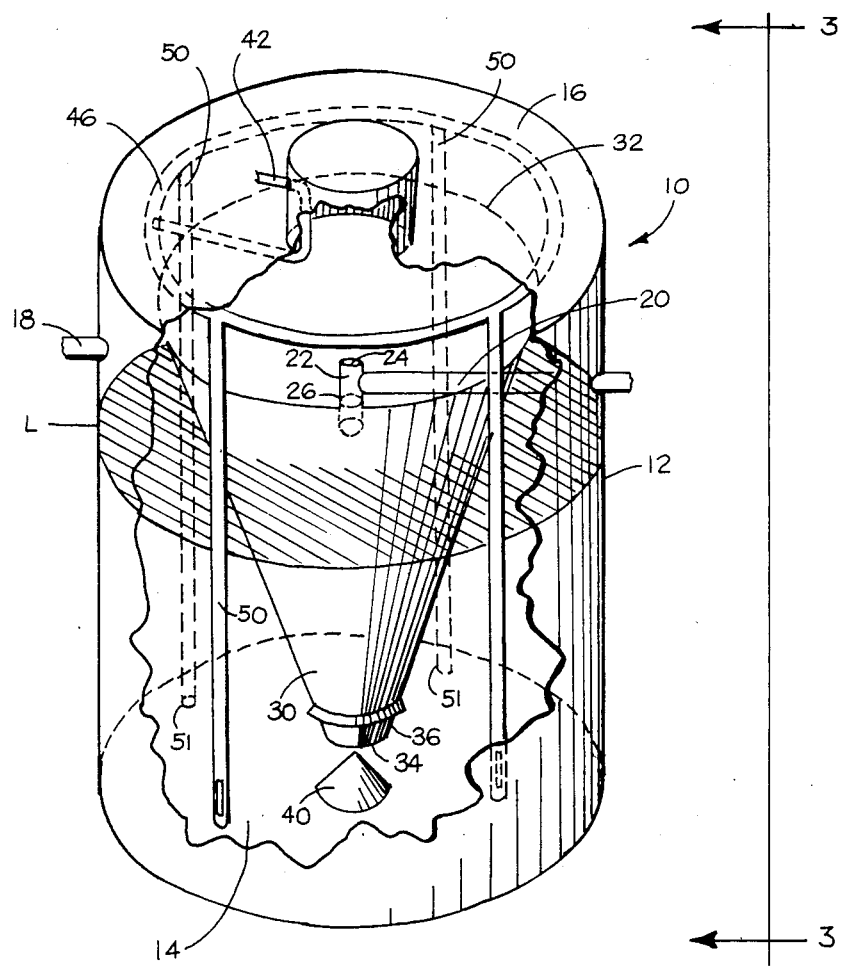
FIG. 2 is a schematic front elevational perspective view of the apparatus of the invention partially cut away.

Referring now to the drawings, the waste treatment apparatus of the invention is generally indicated by the numeral 10. The apparatus includes a tank 12 which is preferably a cylinder having a bottom plate 14 and a top plate 16. Connected to the top of top plate 16 is a hollow cylinder 17 having a cover 19. Waste water enters tank 12 through inlet 18 which is located in the upper portion of tank 12 slightly above the water level "L" shown in FIGS. 2 and 3.

Outlet 20 is a horizontal pipe extending through the side of tank 12 and clarifier 30 having a vertical pipe 22 connected at the interior end thereof. Outlet 20 supports clarifier 30 above plate 14. Vertical pipe 22 has a top end 24 extending above the level of waste water in tank 12 to prevent siphoning through outlet 20 and a bottom end 26 located beneath the water level "L" of the waste water in tank 12. Preferably, a horizontal pipe 27 is attached to the end 26 of pipe 22.

The bottom end 26 of vertival pipe 22 extends downwardly into the waste water in tank 12 a distance sufficient to locate end 26 beneath the level of scum blanket 28. Scum blanket 28 is an accumulation of floating particles which commonly accumulates in the system after a period of operation. The location of the bottom end 26 of vertical pipe 22 beneath the scum blanket 28 is important in order to insure that the effluent being discharged through outlet 20 to be environment is free of solid particles contained in scum blanket 28 and is a clear, odorless liquid safe for discharging into the environment and is in compliance with the regulations of the state in which the apparatus of the invention is utilized.

Vertical pipe 22 is located in the center of clarifier 30. Clarifier 30 is preferably a truncated cone axially aligned with the vertical centerline of tank 12 having an opening 32 in the top thereof and an opening 34 in the bottom end thereof. Opening 32 is larger than bottom opening 34. Clarifier 30 could be in the shape of a hollow truncated pyramid if desired.

Figure 3:
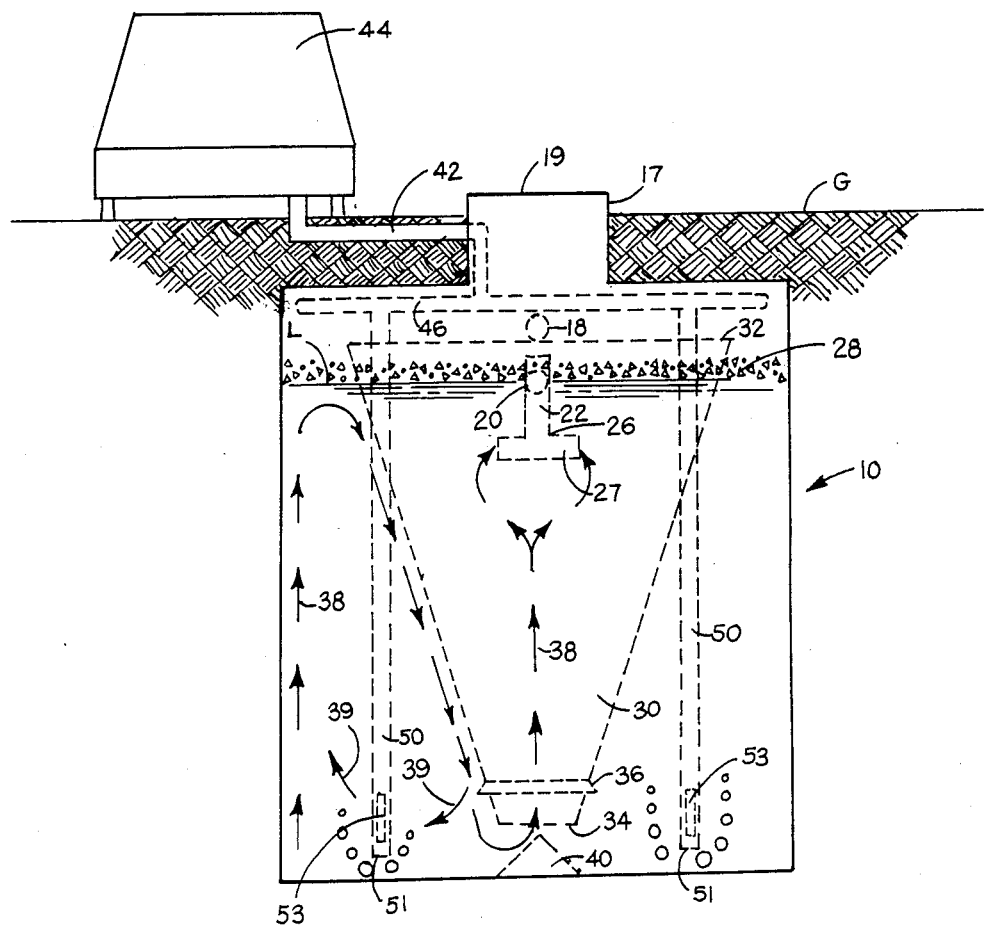
FIG. 3 is a schematic front elevational view partially cut away, of the apparatus shown in FIG. 2 taken along lines 3—3 of FIG. 2 shown buried in the ground with an air blower attached thereto.
Figure 4:
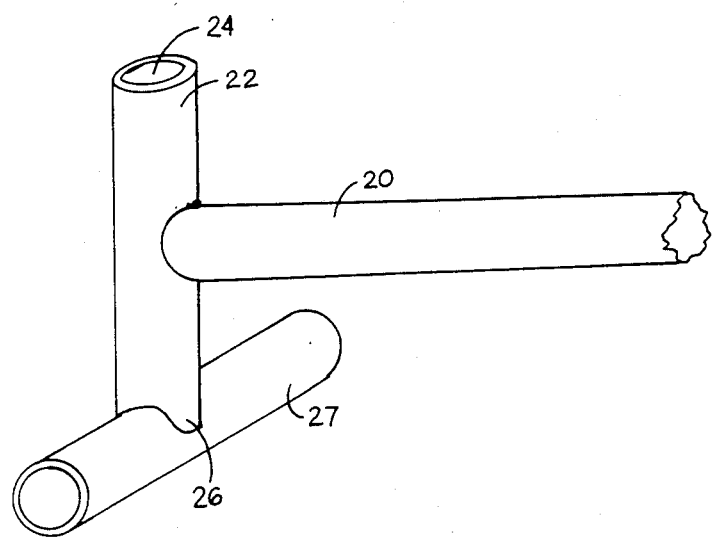
FIG. 4 is a detailed, partially cut away view of the outlet of the present invention.

Preferably clarifier 30 has a baffle 36 located in the lower end thereof in order to achieve the desired flow through the system as indicated by the arrows 39 in FIG. 3, although baffle 36 may be eliminated if desired. A cone shaped deflector 40 is preferably attached to bottom plate 14 and axially aligned with the center of cone shaped clarifier 30 and with the vertical center line of tank 12 to achieve the desired flow of waste water in tank 12, although deflector 40 could be eliminated if desired.

An air supply line 42 shown in FIG. 3 is connected to conventional air pump or blower 44 and to manifold 46. If desired, pump 44 could be fitted onto cylinder 17. Manifold 46 is a circular pipe aligned in a horizontal plane relative to tank 12 and has a series of vertical pipes 50 connected thereto having openings 51 at the lower end thereof and slits 53 in the sides thereof through which air is discharged into the lower portion of tank 12. Preferably there are four vertical air lines 50 provided in the preferred embodiment of the invention.

As can be seen in FIG. 3, top plate 17 extends above ground level G. Preferably, top plate 17 extends about three inches above ground level and the remainder of tank 12 is buried in the ground.

It is important that the slopes of the diverging walls of clarifier 30 be within the range of from about 2.5 to 3.5. Such a range in slope has been found to be beneficial in achieving a smoother and less turbulent flow of waste water through the system.

It has also been found that the volume of clarifier 30 should be in the range of about $\frac{1}{4}$ to about $\frac{1}{3}$ of the daily volume of waste water flowing through tank 10 to achieve clear and odorless effluent.

Also, to acheive clear and odorless effluent, aeration volume should range from about 1.5 to 1.8 times the volume of the daily flow through tha tank 10. Aeration volume is the total volume of tank 10 minus the volume of clarifier 30.

To achieve the most desirable effluent, the ratio of the distance of the water level "L" above the bottom 14 of tank 10 to the inside diameter of tank 10 ranges from about 0.75 to 1.

It is also important in producing a clear and odorless effluent that the surface rise rate, which is the ratio of the daily volume in gallons per day of waste water flowing through tank 10 to the surface area of the clarifier in square feet, ranges from about 40 to about 100 gallons per day per square foot, and that the ratio of the cross-sectional area of inlet 34 in square feet to 1,000 gallons of daily flow through tank 10 ranges from about 0.75 to 1.0.

To operate the apparatus of the invention, the sewage line from a residential dwelling is connected to inlet 18. Sewage fills tank 12 to the outlet level 20, and then drains through outlet 20 to the desired point of disposal. As sewage and waste water enters tank 12, air pumps 44 is activated to blow air through the waste water as indicated in FIG. 3. Air pump 44 can be programmed to operate for various periods throughout the day and night as necessary to treat the waste water.

Although the preferred embodiments of the present invention have been disclosed and described in detail above, it should be understood that the invention is in no sense limited thereby, and its scope is to be determined by that of the following claims.

What is claimed is:

1. An inexpensive, compact, and easily maintained apparatus comprising; means for treating and purifying waste water containing organic pollutants generated by a residential dwelling and for prevents siphoning of effluent from the apparatus and reduces the chance of floating particles from entering the stream of effluent discharged from the apparatus including
   a. a vertical tank having a closed top end for receiving and containing said waste water and discharging said waste water;
   b. a vertical clarifying means connected to said vertical tank and located in said vertical tank having said walls which diverge from a bottom opening to a top opening, said bottom opening being smaller than said top opening, said top opening being located above said water level in said vertical tank and beneath said closed top end of said vertical tank;
   c. air injector means connected to said vertical tank between said vertical tank and said clarifier means for injecting air into the lower portion of said vertical tank to aerate said waste water in said tank, said air injector means including air pump means for supplying air to said vertical tank, said air injector means including vertical air pipe means extending from the upper portion of said vertical tank into the lower portion of and having a lower end with an opening therein for discharging air into the lower portion of said vertical tank;
   d. inlet means located in the upper portion of said vertical tank for supplying waste water to said vertical tank, and
   e. outlet means connected to said vertical tank for removing treated water from said vertical tank, said outlet means being located in said clarifying means in the upper portion thereof, said outlet means comprising a horizontal pipe having an inlet end and a discharge end and having a vertical pipe having a top end and a bottom end connected to the inlet end of said horizontal pipe, said vertical pipe being open at said top end and bottom end, said top end of said vertical pipe extending above the level of said waste water and treated water in said vertical tank to prevent siphoning of said waste water from said vertical tank, the bottom end of said vertical pipe extending beneath said level of said waste water and treated water in said vertical tank, said bottom of said vertical pipe extending beneath said level of said waste water and treated water a distance greater than the depth of any scum blanket of floating particles on said waste water and treated water in said clarifier means to reduce the amount of floating particles discharged from said horizontal pipe.

2. The apparatus of claim 1 wherein deflector means is connected to the bottom of the inside of said tank adjacent to said bottom opening in said tank means.

3. The apparatus of claim 1 wherein said clarifier means has the shape of a truncated cone.

4. The apparatus of claim 3 wherein said tank is a cylinder.

5. The apparatus of claim 4 wherein said inlet means is located above said outlet means.

6. The apparatus of claim 4 wherein the slope of the diverging walls of said clarifier is from about 2.5 to 3.5, the volume of said clarifier is from about $\frac{1}{4}$ to about $\frac{1}{3}$ of the daily volume of water flowing through said tank, the aeration volume of said apparatus is from about 1.5 to about 1.8 of the daily volume of water flowing through said tank, the ratio of the distance of the water level above the bottom of said tank to the inside diameter of the tank is from about 0.75 to 1.0, the surface rise rate of said apparatus is from about 40 to about 100 gallons per day per square foot, and the ratio of the cross-sectional area of inlet 34 in square feet to 1,000 gallons of flow each day is 0.75 to 1.0.

* * * * *